United States Patent
Chen

(10) Patent No.: US 7,796,044 B2
(45) Date of Patent: Sep. 14, 2010

(54) EYE PROTECTION APPARATUS

(75) Inventor: Gui-Rong Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 293 days.

(21) Appl. No.: 12/052,747

(22) Filed: Mar. 21, 2008

(65) Prior Publication Data

US 2009/0160655 A1  Jun. 25, 2009

(30) Foreign Application Priority Data

Dec. 19, 2007 (CN) .................... 2007 1 0203257

(51) Int. Cl.
G08B 23/00 (2006.01)
(52) U.S. Cl. ............. 340/573.1; 340/691.1; 345/10
(58) Field of Classification Search ........... 340/573.1, 340/691.1; 710/129; 345/10
See application file for complete search history.

(56) References Cited

U.S. PATENT DOCUMENTS

| | | | | |
|---|---|---|---|---|
| 5,805,201 | A | * | 9/1998 | Fujiwara ............ 348/818 |
| 6,002,386 | A | * | 12/1999 | Gu ............ 345/690 |
| 6,384,730 | B1 | * | 5/2002 | Chen ............ 340/573.1 |
| 6,483,485 | B1 | * | 11/2002 | Huang et al. ............ 345/10 |
| 2001/0018722 | A1 | * | 8/2001 | Leu ............ 710/129 |

* cited by examiner

*Primary Examiner*—Brent Swarthout
(74) *Attorney, Agent, or Firm*—Frank R. Niranjan

(57) ABSTRACT

An eye protection apparatus includes a sensor adapted for sensing the presence of a person within a predetermined distance range in front of a monitor and outputting a pulse signal, an amplifier unit connected to the sensor for receiving the pulse signal and outputting an amplified signal, a comparator connected to the amplifier unit to receive the amplified signal, a MPU connected to the comparator, and an alarm circuit connected to the MPU. The comparator compares the amplified signal with a predetermined signal, and sends a result to the MPU; the MPU outputs a control signal according to the result to the alarm circuit, and the alarm circuit controls power to the monitor.

17 Claims, 1 Drawing Sheet

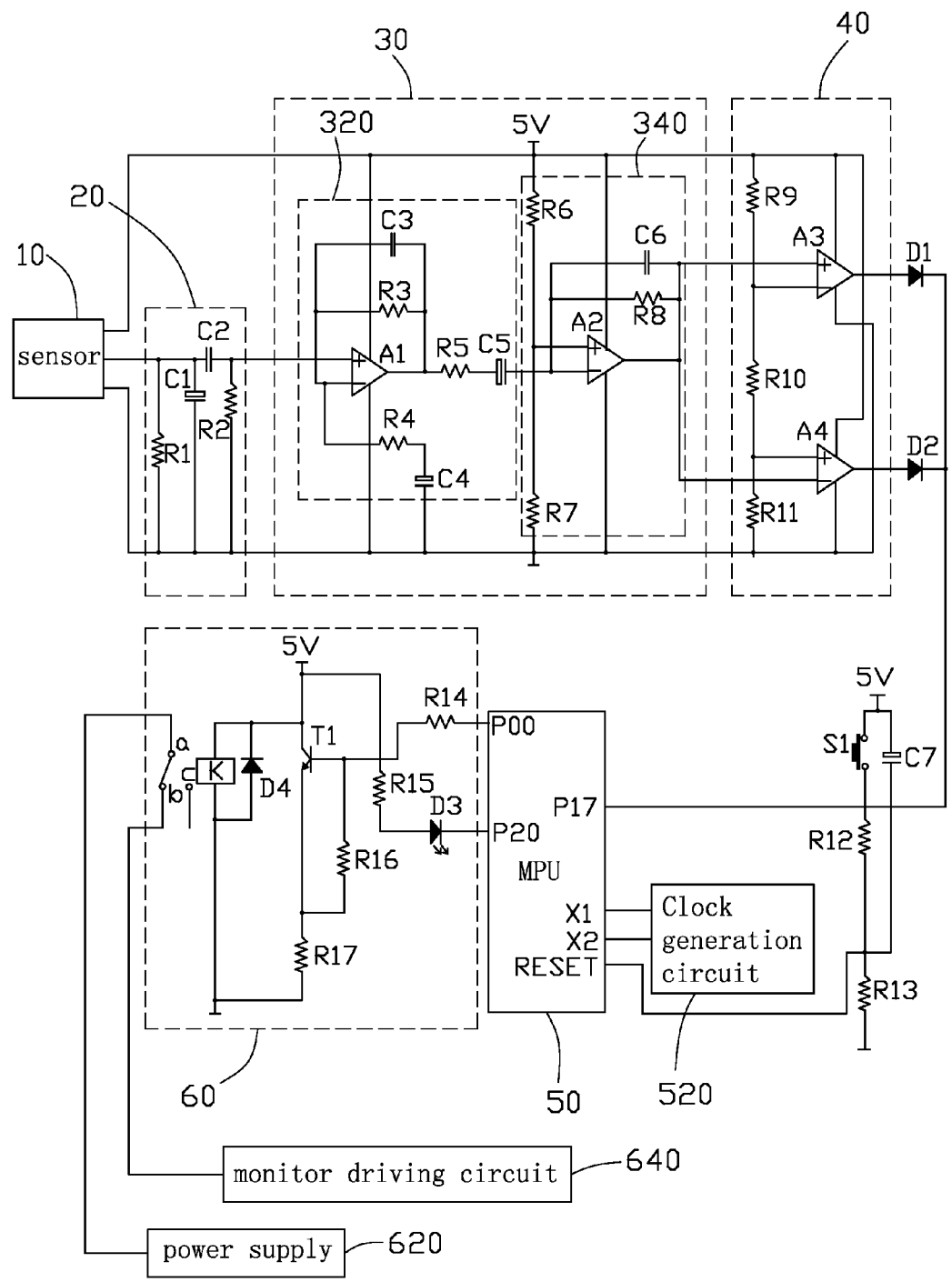

EYE PROTECTION APPARATUS

BACKGROUND OF THE INVENTION

1. Field of the Invention

The present invention relates to an eye protection apparatus.

2. Description of related art

The closer a user sits to a monitor of a computer the brighter images on the monitor will appear. If the user gets too close his/hers eyes may be harmed.

What is needed, therefore, is a protection apparatus for use with monitors, that automatically alerts a user when sitting too close to the monitor for more than a predetermined time.

SUMMARY

An eye protection apparatus includes a sensor adapted for sensing the presence of a person within a predetermined distance of a front of a monitor and outputting a pulse signal, an amplifier unit connected to the sensor for receiving the pulse signal and outputting an amplified signal, a comparator connected to the amplifier unit to receive the amplified signal, an MPU connected to the comparator, and an alarm circuit connected to the MPU. The comparator compares the amplified signal with a predetermined signal, and sends a result to the MPU, the MPU outputs a control signal according to the result to the alarm circuit, and the alarm circuit controls power to the monitor.

Other objects, advantages and novel features of the present invention will become more apparent from the following detailed description of preferred embodiments when taken in conjunction with the accompanying drawings, in which:

BRIEF DESCRIPTION OF THE DRAWINGS

The drawing is a circuit diagram of an eye protection apparatus in accordance with an embodiment of the present invention.

DETAILED DESCRIPTION

Referring to the drawing, an eye protection apparatus in accordance with an embodiment of the present invention includes a sensor 10, a filter circuit 20, a negative feedback amplifier unit 30, a comparator 40, a micro processor unit (MPU) 50, and an alarm circuit 60.

The sensor 10 is mounted on a frame of a computer monitor facing a direction where a user would sit to use the monitor. The sensor 10 is capable of detecting the presence of the user within a predetermined range. The sensor 10 can be an infrared (IR) receiver. The sensor 10 is connected between a 5V power supply and ground, and has an output.

The filter circuit 20 includes two capacitors C1, C2 and two resistors R1, R2. The resistor R1 and capacitor C1 are connected in parallel to form a low-pass filter, which is connected between the output of the sensor 10 and ground. The capacitor C2 and the resistor R2 are connected between the output of the sensor 10 and ground to form a high-pass filter.

The negative feedback amplifier unit 30 includes a first amplifier circuit 320 and a second amplifier circuit 340. The first amplifier circuit 320 includes an operational amplifier (OP) A1, resistors R3-R5, and capacitors C3-C5. The second amplifier 340 includes an OP A2, resistors R6-R8, and a capacitor C6. A non-inverting terminal of the OP A1 is connected to a node between the resistor R2 and the capacitor C2, and an inverting terminal of the OP A1 is connected to ground via the capacitor C4 and the resistor R4. The inverting terminal of the OP A1 is connected to an output terminal of the OP A1 via the resistor R3 and the capacitor C3 connected in parallel. The output terminal of the OP A1 is connected to an inverting terminal of the OP A2 via the resistor R5 and the capacitor C5, a non-inverting terminal of the OP A2 is connected to the 5V power supply via the resistor R6, and connected to ground via the resistor R7, and the inverting terminal of the OP A2 is connected to an output terminal of the OP A2 via the resistor R8 and the capacitor C6 connected in parallel.

The comparator 40 includes third and fourth OPs A3, A4, and three resistors R9-R11. The 5V power supply is connected to ground through the resistors R9, R10 and R11 connected in series. A non-inverting terminal of the OP A3 and an inverting terminal of the OP A4 are both connected to an output terminal of OP A2, an inverting terminal of the OP A3 is connected to a node between the resistors R9 and R10, and a non-inverting terminal of the OP A4 is connected to a node between the resistors R10 and R11. Output terminals of the OPs A3 and A4 are connected to an I/O port P17 of the MPU 50 respectively via diodes D1 and D2.

The MPU 50 has a X1 pin and a X2 pin connected to a clock generation circuit 520 to receive a clock signal. A reset pin RESET of the MPU 50 is connected to ground via the resistor R13, and connected to the 5V power supply via a resistor R12 and a switch S1. The 5V power supply is connected to the reset pin RESET via a capacitor C7.

The alarm circuit 60 includes a light emitting diode (LED) D3, a diode D4, resistors R14-R17, an NPN transistor T1, and a relay. The cathode of the LED D3 is connected to an I/O port P20 of the MPU 50, the anode of the LED D3 is connected to the 5V power supply via the resistor R15. The base of the NPN transistor T1 is connected to an I/O port P00 of the MPU 50 via the resistor R14, the collector of the NPN transistor T1 is connected to the 5V power supply, the emitter of the NPN transistor T1 is grounded via the resistor R17, and the resistor R16 is connected between the base and the emitter of the NPN transistor T1. The 5V power supply is connected to ground via a coil K of the relay and the diode D4 connected in parallel, the relay includes a moving contact a, which selectively engages a first fixed contact b, or a second fixed contact c. The moving contact a and the first fixed contact b are connected to a power supply 620 and a monitor driving circuit 640 respectively, and the second fixed contact c is idle.

In this embodiment, initial voltages at the I/O ports P17, P00, P20 are respectively low, low, and high. Because a viewing distance from eyes of the computer user to the monitor of about 60 cm or more is considered safe, the focal point of the sensor 10 is set at 60 cm, that is, the sensor 10 will only respond to heat of a computer user within 60 cm or less of the monitor.

In use, if the distance between the computer user and the monitor is within 60 cm, the sensor 10 senses heat of the computer user, and outputs a pulse signal, the pulse signal is filtered by the filter circuit 20, amplified by the negative feedback amplifier unit 30, and transmitted to the comparator 40. The comparator 40 is calibrated by selecting resistances of the resistors R9, R10, and R11, so that the magnitude of the pulse signal received by the comparator 40 from the negative feedback amplifier unit 30 is considered normal when the computer user is 60 cm away from the monitor. So when the computer user is too close to the monitor, the magnitude of the pulse signal received by the comparator 40 exceeds the calibrated magnitude of the comparator 40, the comparator 40 outputs a high level signal to the I/O port P17. The MPU 50 receives the high level signal and detects whether the voltage at the I/O port P17 remains high level after a first delay time, for example 10 s, if the voltage at the I/O port P17 is still high, the voltages at the I/O port P20 goes to low level, the LED D3 emits light to alert the computer user, if the voltage at the I/O port P17 is still high level after a second delay time, for example 15 s, the voltage at the I/O port P00 goes to high level, the NPN transistor T1 turns on, the moving contact a engages the third fixed contact c to stop the power supply 620 providing power to the monitor driving circuit 640.

If the distance between the computer user and the monitor exceeds 60 cm, the sensor 10 senses no heat, the voltage at the I/O port P17 is at a low level, the voltages at the I/O ports P00 and P20 respectively remain low and high, the LED D3 emits no light, the transistor T1 is off, the moving contact a engages the fixed contact b, the power supply 620 provides power to the monitor driving circuit 640, and the monitor works normally.

The eye protection apparatus can automatically alert the computer user when he/she is too close to the monitor longer than a predetermined time and shut down the monitor to protect the eyes of the computer user.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. An eye protection apparatus comprising:
    a sensor adapted for sensing the presence of a person within a predetermined distance range in front of a monitor and outputting a pulse signal;
    an amplifier unit connected to the sensor for receiving the pulse signal and outputting an amplified signal;
    a comparator connected to the amplifier unit to receive the amplified signal, and comparing the amplified signal with a predetermined signal;
    a micro processing unit (MPU) connected to the comparator to receive a comparison result and outputting a control signal according to the result; and
    an alarm circuit connected to the MPU to receive the control signal to control power to the monitor,
    wherein a filter circuit is connected between the sensor and the amplifier unit, the filter circuit comprises a first resistor, a first capacitor connected in parallel between an output of the sensor and ground, and a second resistor and a second capacitor connected in series between the output of the sensor and ground.

2. The eye protection apparatus as claimed in claim 1, wherein the amplifier unit comprises a first operational amplifier (OP) and a second OP, a non-inverting terminal of the first OP is connected to a node between the second resistor and the second capacitor, an inverting terminal of the first OP is connected to ground via a third resistor and a third capacitor, the inverting terminal of the first OP is connected to an output terminal of the first OP via a fourth resistor and a fourth capacitor connected in parallel, the output terminal of the first OP is connected to an inverting terminal of the second OP via a fifth resistor and a fifth capacitor, a non-inverting terminal of the second OP is connected to a 5V power supply via a sixth resistor, and connected to ground via a seventh resistor, the inverting terminal of the second OP is connected to an output terminal of the second OP via an eighth resistor and a sixth capacitor connected in parallel.

3. The eye protection apparatus as claimed in claim 2, wherein the comparator comprises a third OP and a fourth OP, the 5V power supply is connected to ground through a ninth resistor, a tenth resistor and an eleventh resistor connected in series, a non-inverting terminal of the third OP and an inverting terminal of the fourth OP are both connected to an output terminal of the second OP, an inverting terminal of the third OP is connected to a node between the ninth resistors and the tenth resistor, a non-inverting terminal of the fourth OP is connected to a node between the tenth resistor and the eleventh resistor, and output terminals of the third and fourth OPs are connected to the MPU.

4. The eye protection apparatus as claimed in claim 3, wherein the MPU comprises a first, a second, and a third I/O ports, the output terminals of the third and fourth OPs are connected to the first I/O port of the MPU respectively via a first diode and a second diode, the second and third I/O ports are connected to the alarm circuit.

5. The eye protection apparatus as claimed in claim 4, wherein the alarm circuit comprises a light emitting diode (LED), a third diode, an NPN transistor, and a relay, the cathode of the LED is connected to the second I/O port of the MPU, the anode of the LED is connected to the 5V power supply, the base of the NPN transistor is connected to the third I/O port of the MPU via a twelfth resistor, the collector of the NPN transistor is connected to the 5V power supply, the emitter of the NPN transistor is grounded, the 5V power supply is connected to ground via a coil of the relay and the third diode connected in parallel, the relay comprises a moving contact and a first fixed contact connected to a power supply and a monitor driving circuit respectively, and a second fixed contact is idle.

6. An eye protection apparatus comprising:
    a sensor adapted for sensing the presence of a person within a predetermined distance range in front of a monitor and outputting a pulse signal;
    an amplifier unit connected to the sensor for receiving the pulse signal and outputting an amplified signal;
    a comparator connected to the amplifier unit to receive the amplified signal, and comparing the amplified signal with a predetermined signal;
    a micro processing unit (MPU) connected to the comparator to receive a comparison result and outputting a control signal according to the result; and
    an alarm circuit connected to the MPU to receive the control signal to control power to the monitor;
    wherein the amplifier unit comprises a first operational amplifier (OP) and a second OP, a non-inverting terminal of the first OP is connected to the sensor for receiving the pulse signal, an inverting terminal of the first OP is connected to ground via a first resistor and a first capacitor, the inverting terminal of the first OP is connected to an output terminal of the first OP via a second resistor and a second capacitor connected in parallel, the output terminal of the first OP is connected to an inverting terminal of the second OP via a third resistor and a third capacitor, a non-inverting terminal of the second OP is connected to a 5V power supply via a fourth resistor, and connected to ground via a fifth resistor, the inverting terminal of the second OP is connected to an output terminal of the second OP via a sixth resistor and a fourth capacitor connected in parallel.

7. The eye protection apparatus as claimed in claim 6, wherein a filter circuit is connected between the sensor and the amplifier unit, the filter circuit comprises a seventh resistor, a fifth capacitor connected in parallel between an output of the sensor and ground, and an eighth resistor and a sixth capacitor connected in series between the output of the sensor and ground.

8. The eye protection apparatus as claimed in claim 6, wherein the comparator comprises a third OP and a fourth OP, the 5V power supply is connected to ground through a seventh resistor, an eighth resistor and a ninth resistor connected in series, a non-inverting terminal of the third OP and an inverting terminal of the fourth OP are both connected to an output terminal of the second OP, an inverting terminal of the third OP is connected to a node between the seventh resistors and the eighth resistor, a non-inverting terminal of the fourth OP is connected to a node between the eighth resistor and the ninth resistor, and output terminals of the third and fourth OPs are connected to the MPU.

9. The eye protection apparatus as claimed in claim 8, wherein the MPU comprises a first, a second, and a third I/O ports, the output terminals of the third and fourth OPs are connected to the first I/O port of the MPU respectively via a first diode and a second diode, the second and third I/O ports are connected to the alarm circuit.

10. The eye protection apparatus as claimed in claim 9, wherein the alarm circuit comprises a light emitting diode (LED), a third diode, an NPN transistor, and a relay, the cathode of the LED is connected to the second I/O port of the MPU, the anode of the LED is connected to the 5V power supply, the base of the NPN transistor is connected to the third I/O port of the MPU via a tenth resistor, the collector of the NPN transistor is connected to the 5V power supply, the emitter of the NPN transistor is grounded, the 5V power supply is connected to ground via a coil of the relay and the third diode connected in parallel, the relay comprises a moving contact and a first fixed contact connected to a power supply and a monitor driving circuit respectively, and a second fixed contact is idle.

11. An eye protection apparatus comprising:
a sensor adapted for sensing the presence of a person within a predetermined distance range in front of a monitor and outputting a pulse signal;
an amplifier unit connected to the sensor for receiving the pulse signal and outputting an amplified signal;
a comparator connected to the amplifier unit to receive the amplified signal, and comparing the amplified signal with a predetermined signal;
a micro processing unit (MPU) connected to the comparator to receive a comparison result and outputting a control signal according to the result; and
an alarm circuit connected to the MPU to receive the control signal to control power to the monitor;
wherein the alarm circuit comprises a light emitting diode (LED), a first diode, an NPN transistor, and a relay, the cathode of the LED is connected to the MPU, the anode of the LED is connected to a first power supply, the base of the NPN transistor is connected to the MPU via a first resistor, the collector of the NPN transistor is connected to the first power supply, the emitter of the NPN transistor is grounded, and the first power supply is connected to ground via a coil of the relay and the first diode connected in parallel.

12. The eye protection apparatus as claimed in claim 11, wherein the relay further comprises a moving contact connected to a second power supply, a first fixed contact connected to a monitor driving circuit, and a second fixed contact is idle.

13. The eye protection apparatus as claimed in claim 11, wherein a filter circuit is connected between the sensor and the amplifier unit, the filter circuit comprises a second resistor, a first capacitor connected in parallel between an output of the sensor and ground, and an third resistor and a second capacitor connected in series between the output of the sensor and ground.

14. The eye protection apparatus as claimed in claim 11, wherein the amplifier unit comprises a first operational amplifier (OP) and a second OP, a non-inverting terminal of the first OP is connected to the sensor for receiving the pulse signal, an inverting terminal of the first OP is connected to ground via a second resistor and a first capacitor, the inverting terminal of the first OP is connected to an output terminal of the first OP via a third resistor and a second capacitor connected in parallel, the output terminal of the first OP is connected to an inverting terminal of the second OP via a fourth resistor and a third capacitor, a non-inverting terminal of the second OP is connected to the first power supply via a fifth resistor, and connected to ground via a sixth resistor, the inverting terminal of the second OP is connected to an output terminal of the second OP via a seventh resistor and a fourth capacitor connected in parallel.

15. The eye protection apparatus as claimed in claim 14, wherein the comparator comprises a third OP and a fourth OP, the first power supply is connected to ground through an eighth resistor, a ninth resistor and a tenth resistor connected in series, a non-inverting terminal of the third OP and an inverting terminal of the fourth OP are both connected to an output terminal of the second OP, an inverting terminal of the third OP is connected to a node between the eighth resistors and the ninth resistor, a non-inverting terminal of the fourth OP is connected to a node between the ninth resistor and the tenth resistor, and output terminals of the third and fourth OPs are connected to the MPU.

16. The eye protection apparatus as claimed in claim 15, wherein the MPU comprises a first, a second, and a third I/O ports, the output terminals of the third and fourth OPs are connected to the first I/O port of the MPU respectively via a second diode and a third diode, the second I/O port is connected to the cathode of the LED, and the third I/O port is connected to the base of the NPN transistor via the first resistor.

17. The eye protection apparatus as claimed in claim 15, wherein the first power supply is a 5V power supply.

* * * * *